March 7, 1961     M. E. EGGMAN     2,973,827

GAS ENTRAPMENT ELIMINATOR

Filed Jan. 13, 1958

INVENTOR.
MAX E. EGGMAN.
BY
Lockwood, Galt, Woodard & Smith
ATTORNEYS.

United States Patent Office

2,973,827
Patented Mar. 7, 1961

2,973,827

GAS ENTRAPMENT ELIMINATOR

Max E. Eggman, Fort Wayne, Ind., assignor to The Magnavox Company, Fort Wayne, Ind., a corporation Filed Jan. 13, 1958, Ser. No. 708,656

4 Claims. (Cl. 183—2.5)

The present invention relates to a device for eliminating gas entrapments or bubbles in viscous fluids and in particular to a device wherein the fluid is projected into a fine stream from which gaseous entrapments can readily escape.

In the manufacture of hermetically sealed control devices, it is necessary to seal the area adjacent connector prongs or other members extending from the control device casing. It is conventional to form this seal by injecting an epoxy resin or other hardening fluid into a cavity formed at the area to be sealed. In the case of epoxy resins, the sealing fluid is conventionally prepared by mixing an activating fluid with a base material, the resulting fluid having a viscosity similar to that of heavy grease. The resin hardens a short time after addition of the activating fluid and, during the interval while it is still in a fluid state, it is loaded into an injection gun and injected into the seal cavity.

In the preparation of the resin and in loading the injection gun, it has been found that gas entrapments or bubbles are frequently formed in the resin. When one of these entrapments is injected into the sealing cavity, a faulty seal will obviously result. One method for meeting this difficulty has been to centrifuge the resin after it has been placed in the injection gun. This method has not been satisfactory since the entrapments near the base of the gun were required to travel a considerable distance through the resin to reach the surface thereof where they could break free. If the resin contained in the injection gun is centrifuged sufficiently to eliminate even the deep-lying entrapments, the ingredients of the resin begin to separate.

The present invention meets this problem by providing a device in which the gas entrapments are brought to the surface of the resin or other fluid without separation of the ingredients of the fluid.

An object of the present invention is therefore to provide a device for eliminating gas entrapments in a fluid, the device having means for forcing the fluid through an orifice to be accumulated free of gas in a receiving chamber from which it may subsequently be dispensed.

A further object of the present invention is to provide a device for eliminating gas entrapments in a fluid contained in the device, which includes a primary chamber and a secondary chamber having means therebetween for increasing the surface area per unit volume of the fluid during its transition between the chambers, the transfer between the chambers being accomplished by a force of acceleration imparted to the fluid.

A further object of the present invention is to provide a device of the type referred to above, which device, when provided with an accelerated motion, forces the fluid contained therein into a fine stream thereby facilitating the release of gaseous entrapments from the fluid, the force of acceleration acting on the fluid causing it to accumulate within the device free of additional gas entrapments.

These and other objects will become apparent as the description proceeds with reference to the accompanying drawings in which.

Figure 1:
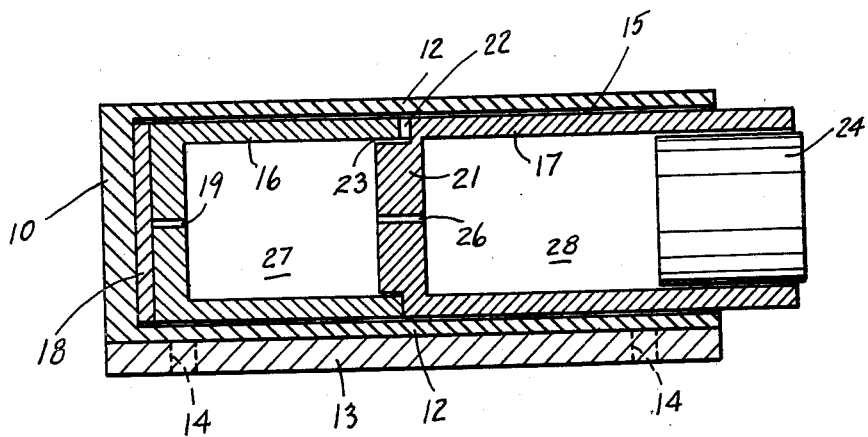
Fig. 1 is a sectional view of a device embodying the present invention.
Figure 2:
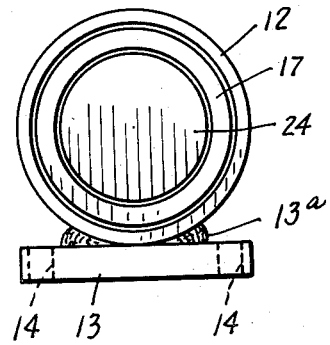
Fig. 2 is an end view of the device shown in Fig. 1.

Referring to the drawings, there is shown a tubular holding fixture or housing having an end wall 10 and sidewalls 12. A base plate 13 having suitable mounting holes 14 therein is secured to the fixture sidewall by any suitable means such as welding, as indicated at 13a.

Nested within the fixture is a container which includes a cup-shaped member 16 and an adjacent, end-abutting cup-shaped member 17. Both of the members 16 and 17 fit loosely within the holding fixture thereby providing clearance space as indicated at 15 for the release of gas therethrough, as will subsequently be described. The inner cup-shaped member abuts against a gasket 18 accommodated within the fixture and is provided with an outlet aperture 19 which is closed by the gasket when the member 16 is in place within the fixture. The end wall 21 of the member 17 is formed so that a portion thereof extends freely within and has clearance with respect to the open end of the member 16 and is notched to provide a vent 22 which communicates with the interior of the member 16 through the clearance indicated at 23. The vent communicates to atmosphere through the clearance space 15. A weighted closure 24 is slidably disposed within the open end of the member 17. An orifice or aperture 26 extends centrally through the end wall 21 of the member 17 and provides communication between the interior of member 17 and the interior of member 16.

It will be evident that the components described provide a container having a central partition therein in which the inner cup-shaped member 16 forms a secondary chamber 27 and the outer cup-shaped member 17 forms a primary chamber 28 with the orifice 26 in the partition providing communication therebetween.

In operation, with the members 16 and 17 inserted in the fixture, a fluid from which gas entrapments are to be removed is introduced into the primary chamber and the weighted closure 24 then inserted over the field. In the case of viscous fluids of the epoxy resin type, introduction into the primary chamber is subsequent to the mixing of the activating fluid into the base fluid. The holding fixture is then provided with a rectilinear accelerated motion in a direction such that the primary chamber 28 leads the secondary chamber 27 and the closure 24 is driven into the primary chamber. The required force acting on the closure may also be provided by installing the housing or holding fixture on a centrifuge with its longitudinal axis extending radially with respect to the axis of rotation of the centrifuge. Centrifugal force acting on the fluid and the closure then provide the fluid transfer impetus.

The force of acceleration acting upon the weighted closure 24 and upon the fluid in the primary chamber, serves to force the fluid through the orifice 26. The fluid is thereby introduced into the secondary chamber in a relatively fine stream, defined by the size of the orifice, and accumulates against the end wall of the secondary chamber. During the accelerated motion of the fixture the gasket 18 prevents the flow of fluid through the outlet opening 19.

As the fluid enters the secondary chamber by reason of its reduction into a fine stream, its surface area per unit volume is increased facilitating the escape of gas entrapments therefrom. Since the secondary chamber communicates to atmosphere through the vent 22, it will be apparent that the pressure in the secondary chamber cannot build up sufficiently to impair the separation of the entrapments from the fluid stream. Because the force of acceleration acting on the fluid throws it to the end of the secondary chamber, it there accumulates in a smooth and compact manner free of additional entrapments or bubbles.

After the completion of the operation, the container may be removed from the fixture and the member 17 separated from the member 16. The bubble-free fluid retained in the secondary chamber may then be dispensed therefrom through the outlet opening 19 by any suitable means such as by applying a discharge piston at the open end of member 16.

While the present invention has been described particularly with reference to removal of gas entrapments from a viscous fluid such as an epoxy resin, it will be understood that it might serve the same function for other types of fluids such as plastics to be used in an injection molding process. In the case of such application it would, of course, be required that the container and its contents be maintained at a temperature sufficient to retain the plastic in a fluid state during the centrifuging operation.

The invention claimed is:

1. A device for eliminating gas entrapments in a fluid comprising a tubular housing, a container nested within said housing, means providing a central partition in said container forming end-opposed primary and secondary chambers, said primary chamber being adapted to accommodate the fluid containing gas entrapments, a weighted closure slidably disposed within said container and forming one wall of said primary chamber, an orifice in said partition providing communication between said primary and secondary chamber, said housing being adapted to have imparted thereto an accelerated motion in a direction such that said secondary chamber trails said primary chamber and said weighted closure leads said primary chamber, the force of acceleration thereby acting on said closure and said fluid forcing said fluid through said orifice into said secondary chamber in a fine stream facilitating the release of gas entrapments therefrom, the force of acceleration acting on said fluid accumulated in said secondary chamber maintaining said accumulated fluid free of additional gas entrapments as the transfer between said chambers proceeds, and a vent in said secondary chamber to prevent gas pressure build-up therein.

2. A device for eliminating gas entrapments in a fluid comprising a tubular housing, a container nested within said housing, means providing a central partition in said container forming end-opposed primary and secondary chambers, said primary chamber being adapted to accommodate the fluid containing gas entrapments, a weighted closure slidably disposed within said container and formnig one wall of said primary chamber, an orifice in said partition providing communication between said primary and secondary chamber, said housing being adapted to have imparted thereto an accelerated motion in a direction such that said secondary chamber trails said primary chamber and said weighted closure leads said primary chamber, the force of acceleration thereby acting on said closure and said fluid forcing said fluid through said orifice into said secondary chamber in a fine stream facilitating the reelase of gas entrapments therefrom, the force of acceleration acting on said fluid accumulated in said secondary chamber maintaining said accumulated fluid free of additional gas entrapments as the transfer between said chambers proceeds, a vent in said secondary chamber to prevent gas pressure build-up therein, and an outlet aperture in said secondary chamber adapted to permit dispensing of said accumulated fluid therefrom upon removal of said container from said housing.

3. A device for eliminating gas entrapments in a fluid comprising a container, means providing a partition in said container forming end-opposed primary and secondary chambers, said primary chamber being adapted to accommodate the fluid containing gas entrapments, a weighted closure slidably disposed within said container and forming one wall of said primary chamber, means permitting transfer of the fluid from said primary chamber to said secondary chamber with the surface area per unit volume of the fluid being increased during such fluid transfer, said container being adapted to have imparted thereto a motion providing a force acting along the axis of said container in a direction such as to drive said closure into said primary chamber thereby forcing the transfer of said fluid from said primary chamber into said secondary chamber, the increase in surface area of the fluid during such transfer facilitating the release of gas entrapments from the fluid, and a vent in said secondary chamber to prevent gas pressure build-up therein.

4. A device for eliminating gas entrapments in a fluid comprising a tubular housing, a container nested within said housing, means providing a central partition in said container forming end-opposed primary and secondary chambers, said primary chamber being adapted to accommodate the fluid containing gas entrapments, a weighted closure slidably disposed within said container and forming one wall of said primary chamber, an orifice in said partition providing communication between said primary and secondary chambers, said housing being adapted to have imparted thereto a motion providing a force acting along the axis of said container in a direction such as to drive said closure into said primary chamber thereby forcing said fluid through said orifice into said secondary chamber in a fine stream facilitating the release of gas entrapments therefrom, the action of said force on said fluid accumulated in said secondary chamber maintaining said accumulated fluid free of additional gas entrapments as the transfer of fluid between said chambers proceeds, a vent in said secondary chamber to prevent gas pressure build-up therein, and an outlet aperture in said secondary chamber adapted to permit dispensing of said accumulated fluid therefrom upon removal of said container from said housing.

References Cited in the file of this patent

UNITED STATES PATENTS

| 2,507,797 | Martin | May 16, 1950 |
| 2,600,464 | Boe | June 17, 1952 |
| 2,753,010 | Walther | July 3, 1956 |
| 2,797,767 | Brooke et al. | July 2, 1957 |